Patented May 4, 1954

2,677,639

UNITED STATES PATENT OFFICE

2,677,639

COMPOSITIONS FOR TREE THERAPY

Frank L. Howard, Kingston, Nestor E. Caroselli, Providence, and Albert W. Feldman, Saunderstown, R. I.; said Caroselli assignor to F. A. Bartlett Tree Expert Company, Stamford, Conn., a corporation of Connecticut, and said Howard and said Feldman assignors to The Board of Trustees of Rhode Island State Colleges, Providence, R. I., a corporation of Rhode Island No Drawing. Application July 2, 1949,
Serial No. 102,946

5 Claims. (Cl. 167—14)

This invention relates to a method of inhibiting systemic vascular wilt diseases caused by toxins in trees, including layer shrubs. While the invention is here disclosed primarily in its application to the control of the so-called Dutch elm disease of elm trees, it is not specifically limited to the treatment of that disease but is of broader application as indicated.

Two of the present inventors have heretofore pointed out (Patent No. 2,334,556, granted November 16, 1943) that the pathogenic fungus *Phytophthora cactorum* produces a toxin which will travel through the conducting tissue of certain trees, particularly sycamore, Norway maples and beeches, producing the disease known as "bleeding canker"; and that the pathological condition of such trees may be treated by introducing into the conducting tissues, according to the technique disclosed in said patent, a dilute solution of a hydrochloride salt of azobenzene containing an $NH_2$ group, as therein more specifically described. The present invention is directed to the treatment not only of the fungus abovementioned, but also the treatment of other fungi, particularly *Ceratostomella ulmi*, the cause of Dutch elm disease, *Fusarium lycopersici*, the cause of solanaceous plant wilts, and *Verticillium spp.* and *Rhizoctonia spp.*, the cause of certain other wilts. Our laboratory studies on the physiology of these pathogenes indicate that they produce a toxin, and these studies have led to the development of methods for standardizing toxin production, perfecting rapid bioassay techniques to evaluate therapeutants, determining factors responsible for toxin formation, and learning something about the complex nature of the toxic principle. "Toxin," as here used, includes the direct and/or indirect metabolic products, resulting from the action of a microorganism on or in a living or dead substrate, which exert a deleterious effect on plant tissues or affect the basic physiology of the host so that an abnormal physiological response occurs.

We have produced the toxin of *C. ulmi* in the laboratory by growing the pathogenic fungus in liquid synthetic media adjusted to pH 4.25 with citrate buffer. Greatest yields are obtained when 50 ml. of the inoculated medium contained in 250 ml. flasks are supported on a constantly shaking "table" for 7 days at about 26° C. Synthetic media optimum for toxin production contain glucose as the carbon source, l-asparagine for nitrogen, yeast extract for B-vitamin complex, citric acid for buffering, and other basic essential ions. The amount of toxin resulting from the metabolism of the fungus is a direct function of the pH of the medium. Assays have shown that up to 500 times more toxin is produced at pH 4.25 than when the medium is adjusted to pH 7.0 with citric acid-sodium hydroxide. Furthermore, there is an irreversible inactivation of the toxin by hydroxyl ions irrespective of the associated cation.

Quantitative determination of the titre of toxins has been obtained by measuring their effect upon the rate of protoplasmic streaming, the respiration of various host tissues by manometric methods, and the wilting of various species of seedlings grown under standardized conditions. The last has proved most satisfactory from the standpoint of simplicity and rapidity of action and permits the screening of a large number of toxin-inactivating chemicals at a series of dosages. This allows evaluation of the concentration necessary for toxin inactivation as well as phytotoxicity of the chemical.

For illustration we here disclose our invention in connection with the treatment of elm trees for the Dutch elm disease caused by *C. ulmi*. Our observations have been validated by practical field demonstration on a large number of elm trees growing on private estates in New York, Pennsylvania, Connecticut and Massachusetts where damage from the Dutch elm disease has been most severe. Some of the trees used in field tests had trunk diameters ranging from 30 to 60″ and were growing in soils ranging from pH 4.2 to 5.4.

According to the present invention water, substantially free from undissolved solids and containing in solution certain substances hereinafter mentioned, is introduced into the conducting tissues of an elm tree through the bark thereof. The technique of fluid introduction is similar to that shown in Patent No. 2,334,556—namely, drilling the bark while the bit of the drill is under water, and then without breaking the water-seal inserting a tube into the hole through which the prepared solution can pass into the tree tubes. In this way stoppage of the tissues by formation of an air bubble is avoided. Furthermore, it is important in carrying out the present invention that the solution introduced into the tree shall be free, or substantially free, of undissolved solids which would block the conducting tissues mechanically. It is not essential that the solution be completely clear of dispersed solids in a fine state of suspension provided these solids are able to be dissolved promptly within the tree tissue without material interruption to the flow of liquids therein. However, we prefer, if the solution is noticeably cloudy, to let the solids settle and decant the clear supernatant liquid before introduction into the tree.

The watery solution, according to the present invention in its broadest sense, preferably but not necessarily contains an approximately saturated solution of calcium hydroxide (Ca(OH)$_2$) and also contains, in solution, urea within the concentration range set forth below. To this solution may optionally be added, according to more specific forms of the invention, the hydrochloride salt of diaminoazobenzene or sugar, or both, at a concentration for each which is not higher than that shown in the paragraphs which follow.

Calcium hydroxide is preferably got into solution by dissolving commercial hydrated lime in water, letting the undissolved solids settle, and decanting the clear supernatant liquid. Calcium hydroxide is sparingly soluble in cold water (about 1 gram per litre). We prefer where possible to use hot water in order to dissolve a larger amount of calcium hydroxide.

Urea is, according to the present invention, combined with calcium hydroxide. In the treatment of an elm of 20-inch trunk diameter at breast height, about 4 gallons of solution is required (which when cold will dissolve about ½ ounce of calcium hydroxide). In such an amount of solution (4 gallons) up to about 1 pound of urea may be dissolved. At higher concentrations it will cause burning of young foliage and be otherwise detrimental to the tree. We prefer to use about 6 ounces per 4 gallons in practicing our invention. The function of the urea is to serve as a quick-acting neutralizing agent for the toxin, and also as a metabolite for the tree. If too little is used, these functions are not appreciably performed.

To the foregoing may be added, in solution, one or more of the substances mentioned below, as set forth in the subjoined examples and claims:

(a) *The hydrochloride salt of diaminoazobenzene.*—Best results have been obtained by using the hydrochloride salt of 3,3' diaminoazobenzene which has the formula (3,3') HCl.NH$_2$.C$_6$H$_4$.N:N.C$_6$H$_4$.NH$_2$.HCl Fairly good results have been obtained with the corresponding salts of 4,4'- and 2,4'-diaminoazobenzene, the latter of these being somewhat less effective than the former. The hydrochloride salt of diaminoazobenzene is commercially available in the form of a thick liquid of approximately the consistency of molasses and containing excess acetic acid. We first neutralize this material with sufficient 20% solution of KOH to bring the pH of the resulting solution to about 8.2 and add it directly to the solution containing calcium hydroxide and urea. Excessive amounts of the hydrochloride salt of diaminoazobenzene will cause injury to the tree. We have found that this injury begins to appear when 4 gallons of the solution contain substantially more than approximately 7 ounces, on a dry weight basis, of the above described salt. The function of this salt is to neutralize the action of the toxin, and if too little is used this function is not appreciably performed unless by other means.

(b) *Sugar in the form of sucrose or dextrose.*—We prefer to use ordinary cane sugar (sucrose) because of its cheapness. Sugar may be added to the solution in any amount which will not cause necrosis of the foliage. We have found that the upper limit is about 3.3 pounds per 4 gallons of water, but preferably we use about 1 pound. The function of the sugar is to serve as a metabolite for stimulation of tree growth. If too little is used, this function is not appreciably performed unless by other means.

The following are examples of our method:

*Example 1*

In 4 gallons of water we dissolved:

|  | Ounces |
|---|---|
| Calcium hydroxide | ½ |
| Urea | 6 | and divided this solution into 30 one-pint bottles, this being sufficient for treatment of one 20" elm tree by the trunk injection method set forth above. A series of trees were treated in this fashion, some before inoculation with *C. ulmi* and some after. Symptoms of the Dutch elm disease were inhibited in 40% of the trees inoculated one week after treatment, and 30% of those inoculated one week before treatment. All of a series of elms growing in similar soil conditions, and inoculated without treatment, were dead or dying within three weeks.

*Example 2*

Approximately 1.7 pounds of a concentrated and molasses-like solution of the hydrochloride salt of (3,3') diaminoazobenzene acidified with acetic acid was neutralized to a pH of 8.2 with a 20% solution of KOH. This required about 270 cc. of the KOH solution, and the resulting mixture contained, on a dry weight basis, approximately 7 ounces of the hydrochloride salt of diaminoazobenzene and approximately 2 ounces of KOH. Water was then added to make the solution up to 4 gallons. In this solution we dissolved ½ ounce of calcium hydroxide and 6 ounces of urea.

This solution, applied as in Example 1, achieved control in 80% of the trees inoculated a week after treatment, and 60% of the trees inoculated a week before treatment.

*Example 3*

In 4 gallons of water we dissolved:

| Calcium hydroxide | ounces | ½ |
|---|---|---|
| Urea | do | 6 |
| Sugar | pounds | 1 | and applied the solution as in Example 1. Control was achieved in 50% of the trees inoculated a week after treatment, and in 30% of those inoculated a week before treatment.

We use the word "sub-phytocidal" in the subjoined claims to indicate an amount or concentration of one or more of the dissolved substances hereinabove mentioned below that which will cause necrosis of the foliage tips or of young growth, root injury, leaf browning or killing of tree tissue, or will be otherwise seriously detrimental to the living tissue of the tree. We have set forth herein, expressed as the amount per 4 gallons of solution, the approximate upper limit of concentration for each of these substances respectively, but it will be understood that these upper limits cannot be stated more precisely since they are somewhat approximate in nature, as stated in more detail above.

We have used the expression "control" to mean that symptom development is largely or substantially inhibited over a prolonged period of time, in most cases several weeks or months, indicating that a pronounced beneficial effect has been achieved. We do not claim for our invention that it will, in all cases, achieve an absolute or final "cure" of the Dutch elm disease in every tree to which it is applied. Disease which is already far advanced, especially in trees where a large percentage of the foliage and branches are already seriously affected, apparently cannot be controlled through the use of our invention, though some benefits appear in almost every case. Our invention appears to be chiefly beneficial in the case of trees which have been recently infected, or in which the progress of the disease has not yet become far advanced. Where not more than about 10% of the tops of the trees are dead from the Dutch elm disease, our method had apparently caused about 90% of such trees to recover.

We do not intend that our invention shall be limited to the specific examples set forth above, which are merely for purposes of illustrating the best ways known to us of carrying out the invention, but that the same shall be taken and construed as set forth in the subjoined claims.

We claim:

1. An injectable composition of matter for inhibiting vascular wilt diseases caused by toxins in plants consisting of an approximately saturated water solution of calcium hydroxide containing, in solution, urea at a concentration corresponding to about 6 ounces and not more than about 1 pound thereof on a dry weight basis in four gallons of water, and the hydrochloride salt of diaminoazobenzene at a toxin neutralizing concentration not exceeding a concentration corresponding to about 7 ounces thereof on a dry weight basis in four gallons of water, the said solution being substantially free of undissolved solids.

2. The composition described in claim 1 in which the hydrochloride salt is the salt of 3,3'-diaminoazobenzene.

3. The composition described in claim 1 in which the hydrochloride salt is the salt of 4,4'-diaminoazobenzene.

4. The composition described in claim 1 in which the hydrochloride salt is the salt of 2,4'-diaminoazobenzene.

5. The composition described in claim 1, also containing in solution sugar at a concentration corresponding to about 1 pound and not more than about 3.3 pounds thereof on a dry weight basis in four gallons of water.

References Cited in the file of this patent

UNITED STATES PATENTS

| Number | Name | Date |
|---|---|---|
| 1,950,068 | Spangenberg | Mar. 6, 1934 |
| 2,334,556 | Howard et al. | Nov. 16, 1943 |

OTHER REFERENCES

Horsfall et al.: Phytopathology, volume 32 (1), page 22, January 1942.

"A Catalogue of Insecticides and Fungicides" compiled by Donald E. H. Frear (1948), volume II, page 23, column 2, compound 183–1021.

"A Catalogue of Insecticides and Fungicides" compiled by Donald E. H. Frear (1948), volume II, page 51, column 1, compound 1126–1325.